Dec. 22, 1959     E. ROOT 3RD     2,918,215
COUNTING DEVICES
Original Filed Aug. 13, 1947     5 Sheets-Sheet 1
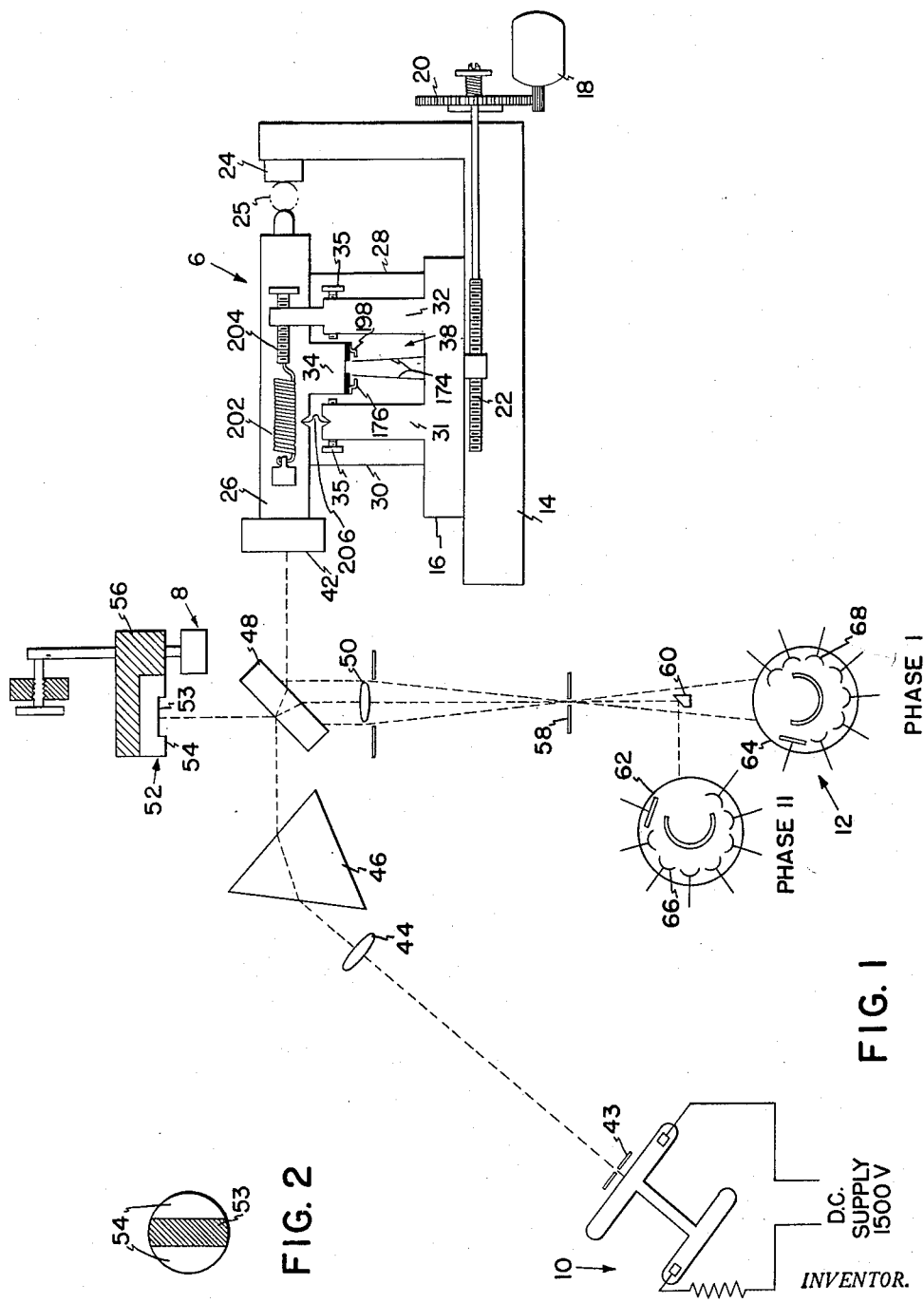
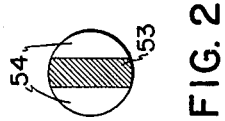
FIG. 2
FIG. 1
INVENTOR.
Eldyn Root III
BY Kenway Jenney
Witter & Hildreth
ATTORNEYS Dec. 22, 1959    E. ROOT 3RD    2,918,215
COUNTING DEVICES Original Filed Aug. 13, 1947    5 Sheets-Sheet 2

INVENTOR.
Elihu Root III
BY Kenway Jenney
     Witter & Hildreth
         ATTORNEYS Dec. 22, 1959     E. ROOT 3RD     2,918,215
COUNTING DEVICES Original Filed Aug. 13, 1947     5 Sheets-Sheet 4

INVENTOR.
Elihu Root III
BY Kenway Jenney
Witter & Hildreth
ATTORNEYS

Dec. 22, 1959  E. ROOT 3RD  2,918,215
COUNTING DEVICES

Original Filed Aug. 13, 1947  5 Sheets-Sheet 5

INVENTOR.
Elihu Root III
BY Kenway Jenney
Witter & Hildreth
ATTORNEYS

United States Patent Office 2,918,215
Patented Dec. 22, 1959

2,918,215
COUNTING DEVICES

Elihu Root 3rd, Springfield, Vt.

Original application August 13, 1947, Serial No. 768,300, now Patent No. 2,604,004, dated July 22, 1952. Divided and this application June 21, 1952, Serial No. 294,811

7 Claims. (Cl. 235—92)

The present invention relates to counting devices, and more particularly to devices for making additive and subtractive counts. This application is a division of my copending application, Serial No. 768,300, filed August 13, 1947, now Patent No. 2,604,004 granted July 22, 1952.

The principal object of the invention is to provide a reversible counter, i.e., a counter capable of adding or subtracting, in which the possibility of false counts due to vibration or to uncertainties or ambiguities at transition points is avoided.

The purposes with which the invention are concerned will be appreciated upon consideration of the use of the counter in combination with measuring apparatus whereby an article is measured by counting a succession of interference "fringes," as described in my above-mentioned application. The counter is operated in what may be termed a substantially continuous fashion, as distinguished from the counting of impulses. While reversible counters for continuous phenomena have been proposed, they have, so far as I am aware, suffered from a defect in the nature of backlash in that reversals which occur in the neighborhood of a transition point may give rise to miscounts.

According to the present invention the counting system is free of backlash and is subject to continuous reversible control in the neighborhood of a transition point, whereby a correct net count is obtained, notwithstanding oscillations, whether due to "noise" or otherwise, that may occur in the system. The invention is embodied in both mechanical and electronic forms, as will hereinafter appear.

Further features of the invention consist of certain novel features of construction, combinations and arrangements of parts, hereinafter described and particularly defined in the claims.

Figure 3:
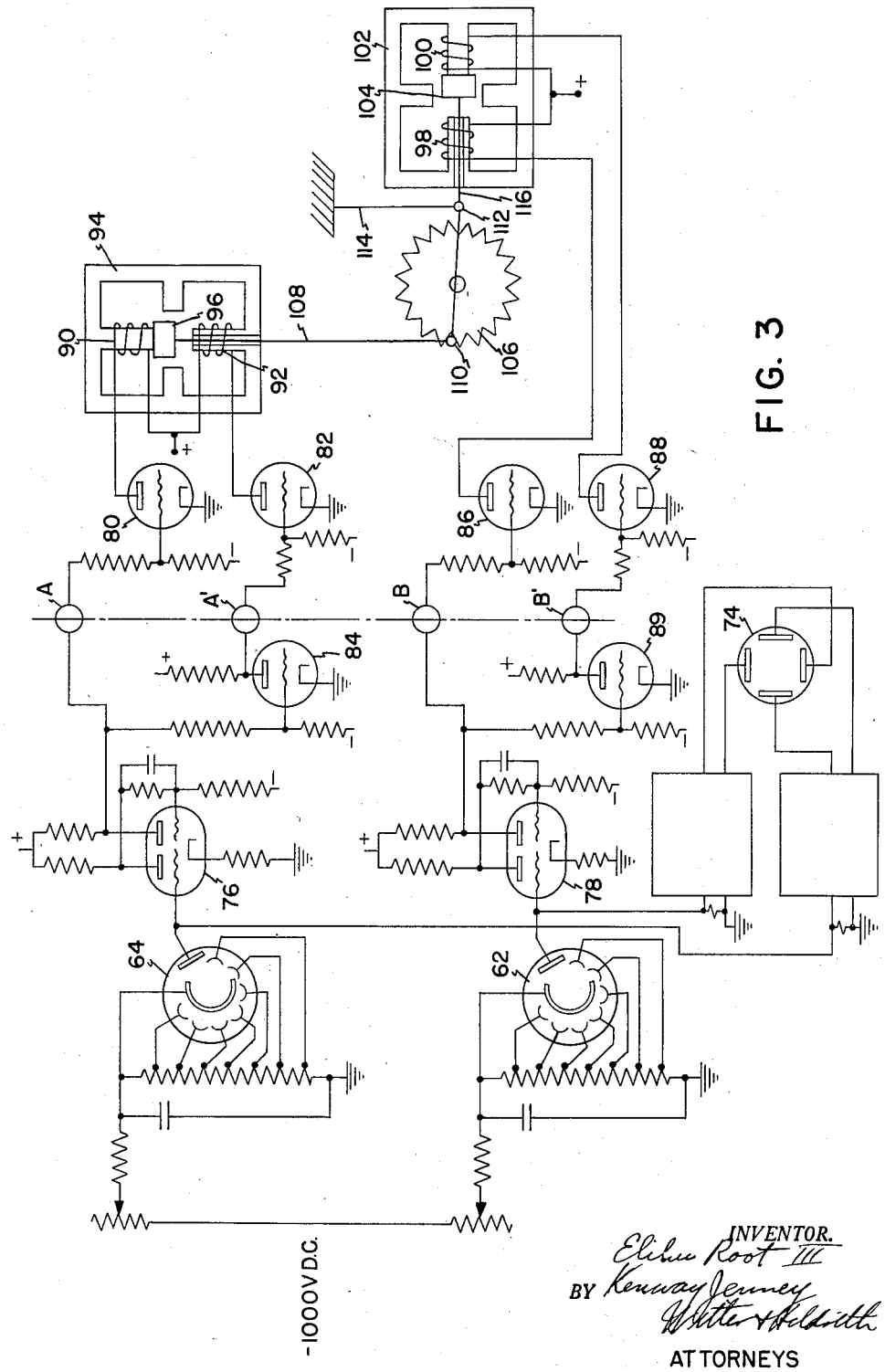
Figure 4:
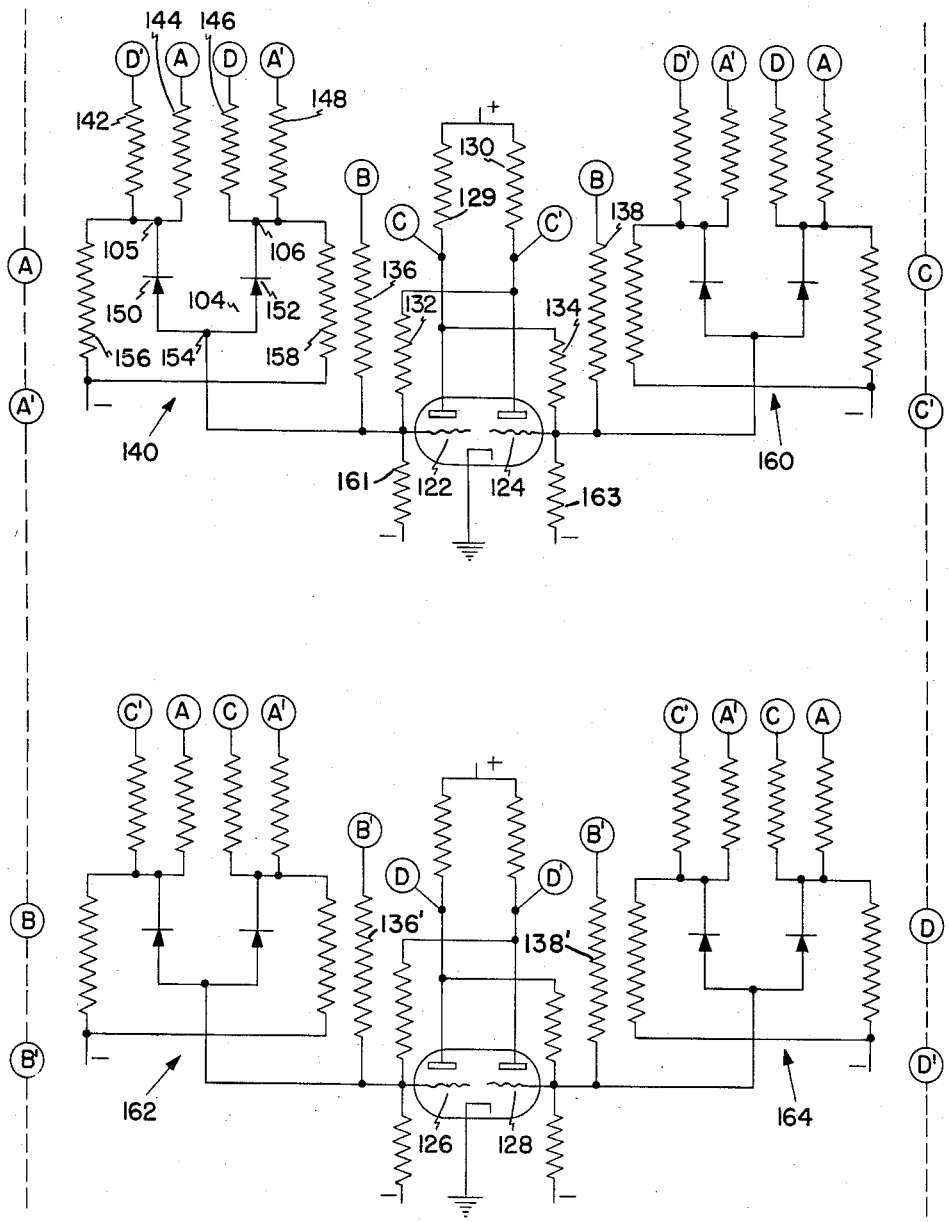
Figure 5:
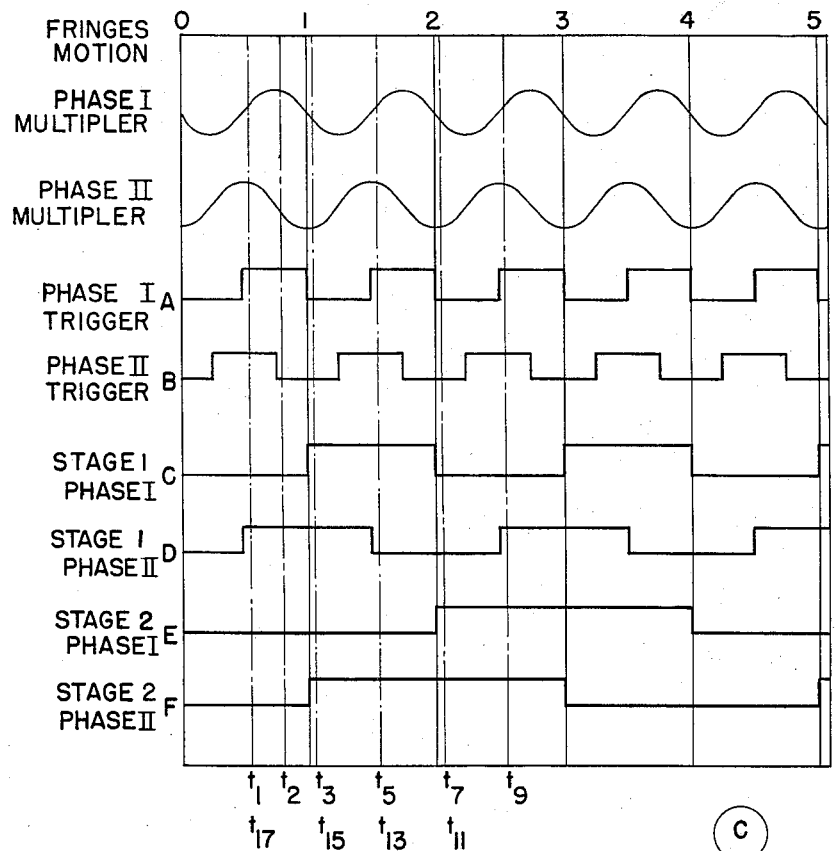
Figure 6:
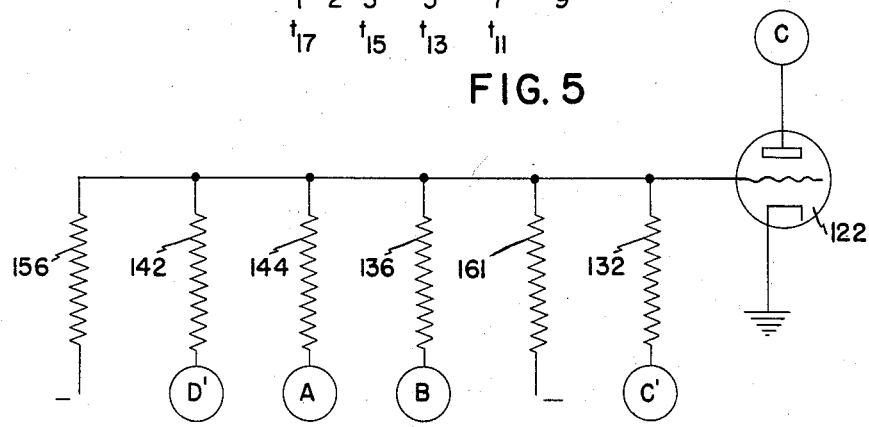
Figure 7:
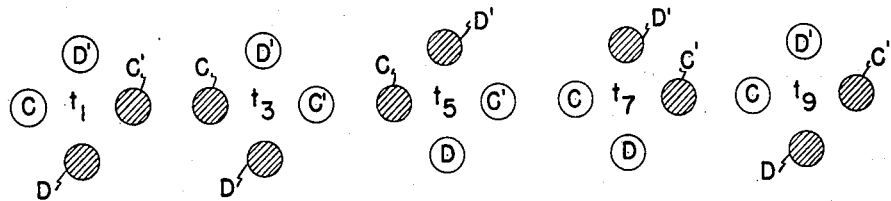
Figure 8:
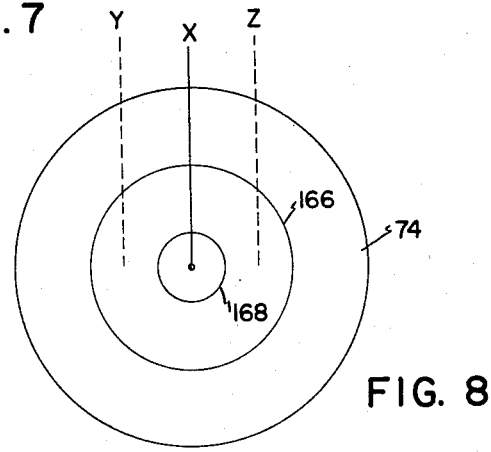
Figure 9:
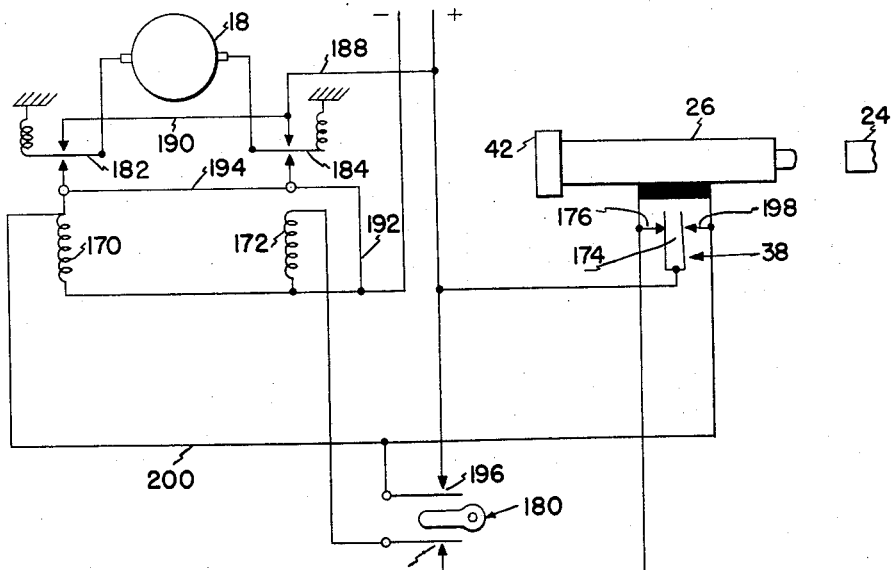

In the accompanying drawings Fig. 1 is a diagram of the preferred form of measuring and optical apparatus; Fig. 2 is a view of the field of illumination due to the formation of interference effects by one of the reflecting mirrors; Fig. 3 is a diagram of the electrical connections; Fig. 4 is a diagram of one form of counting apparatus; and Fig. 5 is a graph illustrating operation of the counter; Fig. 6 is a diagram of a portion of the counter of Fig. 4; Fig. 7 is a diagram showing the counting sequence; Fig. 8 is a diagram illustrating the principle of the counter; and Fig. 9 is a diagram of the motor control circuit.

The counting system of the present invention is described as embodied in a system for precise measurement by the counting of changes of illumination due to interference phenomena. To aid in an understanding of the operation of the counting system, the preferred form of measuring apparatus, as described in my above-mentioned application, will be described here.

The apparatus shown in the drawing of Fig. 1 comprises a measuring head indicated generally at 6, an optical device comprising an interferometer indicated generally at 8, a source of light for the optical system indicated at 10, and photo-sensitive means indicated at 12 responsive to the changes of illumination from light to dark and dark to light. These changes are referred to herein by the technical term "fringes" although it will be understood that the field does not present the succession of light and dark rings or bands frequently seen in interference phenomena; in other words, the term "fringe" as here used simply means a half wavelength. The invention further comprises counting means to be later described in detail.

Referring first to the measuring device 6, this comprises a base 14 on which is mounted a carriage 16 adapted to be driven by a motor 18 which is connected to the carriage through suitable gearing 20 and a screw 22. The base carries an anvil 24 and the carriage 16 carries a head 26 adapted to be moved toward or from an anvil 24. As shown in the drawing the head 26 is resiliently mounted on the carriage by means of leaf springs or reeds 28 and 30. Posts 31 and 32 extend upwardly from the carriage and form a yoke embracing a projection 34 depending from the measuring head. The yoke is provided with screws 35 which may be adjusted to give any desired lost motion between the carriage and head.

Mounted on the carriage is a switch 38, the contacts of which are operated by a projection depending from the head 26 and so arranged that the contacts are normally closed, but when the head 26 is displaced to the left with respect to the carriage, the contacts are opened. If a piece of work 25 is placed adjacent to the anvil 24 and the motor is operated, the head will move until it engages the work whereupon the contacts are opened because of the flexure of the springs 28 and 30. Further details of the head and a servo control therefor shown in Fig. 9 will be described later.

The head is provided at its outer end with an accurate flat reflecting surface indicated at 42 which forms a part of the optical system.

The optical system comprises an interferometer involving certain conventional elements but with special features peculiar to the present invention. The light source 10 is preferably a tube capable of emitting sharp spectral lines, such as a krypton discharge tube. The light from the scource is directed through a diaphragm 43, a collimating lens 44 and prism 46 through a half-reflecting mirror 48 to the mirror 42. Light reflected back from the mirror 42 is again reflected from the surface 48 and is directed toward an objective lens 50.

Part of the light falling on the half-reflecting mirror 48 is directed toward the fixed mirror 52. This latter mirror is preferably formed by evaporating aluminum cn a glass or metal by a process now well known. A central strip or band 53 is provided in the mirror 52, this strip being likewise a reflecting surface and spaced from the side portions 54 of the mirror by a distance equal to one-eighth of a wavelength of the light emitted from the source 10. Its formation may be accomplished by placing a mask over the central portion of the mirror while the metal is deposited on the remainder of the mirror. Or the deposit may be formed on the portion 54 while the rest of the mirror is masked in which case the band will be exhibited as a raised portion instead of a depression in the surface. It will be understood that any arrangement may be used which will provide two adjacent reflecting surfaces differing in height by an eighth wavelength (or an add multiple thereof). In any case it is desirable to have one phase (here represented by the strip 53) embraced between two symmetrical outer portions 54, which constitute the second phase. As will be shown later, the optical outputs of the two phases are fed to photo-sensitive devices to generate a two-phase electrical output which is utilized to operate the counter. For accurate interpolation to fractional wavelengths, it is important that the two phases be of equal intensity and in quadrature. If the mirror 52 were formed with the phases side-by-side, and if the mirror were slightly out of exact angular adjustment, the quadrature relation would be lost. It can be shown, however, that with the mirror 52 having symmetrical outer portions, the contributions from the outer portions will add vectorially in such a way that a fairly large misadjustment of the mirror produces no substantial departure from the quadrature relation. Any arrangement may be used which splits the area representing one or both phases, so that each phase is symmetrically disposed with respect to the center of the mirror as a whole. The mirror 52 is mounted in a suitable frame 56 arranged for accurate angular adjustment.

The light is focused by the lens 50 into the plane of a diaphragm 58 having an aperture to pass only one of the spectral lines, the several lines having been dispersed by the prism 46. If the light passing through diaphragm 58 were intercepted by a screen in the position of mirror 60, the pattern of light would appear as in Fig. 2. For one position of the measuring head the central band would constitute a dark "fringe" due to the interference phenomenon involving light reflected from the central strip 53, while the outer portions of the mirror 54 show mean illumination. This is for one position of the measuring head mirror 42. Motion of the mirror 42 by a quarter wavelength (so that the path from 48 to 42 and back again is changed by a half wavelength) results in changing the image of Fig. 2 to a light center band with the outside portions again at mean intensity.

The light from the band 53 is reflected by the mirror 60 to the sensitive element of photocell 62. The light reflected from the outside areas of the mirror 52 passes the mirror 60 and falls on a second photocell 64. The cell 64 constitutes one phase of the photosensitive system, herein called phase I, while the cell 62 constitutes a second phase (phase II). The photocells 62 and 64 are included in electron multipliers 66 and 68 of conventional form.

Upon motion of the head 26 alternate dark and light interference fringes are formed at the surface of the mirror 48. Considering only the reflection from the center surface 53, the light falling on the photocell 62 will change from minimum to maximum and back to minimum for each half wavelength of motion of the head 26. The variation of light falling on the tube 62 is substantially sinusoidal.

Because of the spacing of an eighth wavelength between the surfaces 53 and 54, the light variations projected on the cell 64 will likewise be subject to a sinusoidal variation but with a phase difference of a quarter wavelength (90 degrees) from the variations of intensity on the tube 62. The phase of the variations in the tube 62 either leads or lags that of the tube 64, depending on the direction of movement of the head 26. Thus when the head is moved in one direction, there is a 90° phase lead and when the head is moved in the opposite direction, there is a 90° phase lag between the two tubes. This difference between lead and lag is utilized to dictate whether the count of fringes at any particular time is additive or subtractive.

As shown in Fig. 3 the outputs of the multipliers 62 and 64 are fed to suitable amplifying, recording and registering circuits. The output of the phase I, namely, that from the tube 64, is fed to the plates in two quadrants of cathode ray tube 74. The output of phase II is fed to the other two quadrants of the tube 74. It will be apparent that by the application to the tube 74 of voltages which differ in phase, both in time and space, there will be a rotating trace on the screen of the tube. This trace will rotate one revolution for the motion of the head 26 corresponding to one-half wavelength of light. If the motion of the head is made sufficiently slow, the rotations of the spot both in the forward and reverse direction may be counted by an operator. However, since there are about 100,000 wavelengths per inch, such a counting procedure would be too slow and laborious except in the measurement of extremely small distances. Accordingly, the tube 74 is preferably not used as a counter but is provided to give an interpolation for fractional wavelengths. The counting of integral fringes is then preferably accomplished by electronic or mechanical means. By noting that each revolution corresponds to one-half wavelength, the ultimate measurement may be determined to an accuracy in terms of a small fraction of a wavelength.

In order to effect automatic counting, the outputs of the tubes 64 and 62 are fed to suitable amplifiers or trigger circuits indicated respectively at 76 and 78 whereby the sine-wave outputs may be converted to rectangular waves in a well known manner. These rectangular waves are separated in phase by 90°, either leading or lagging depending on direction of motion of the measuring head. The outputs of the devices 76 and 78 are then fed to a counter by which additive and subtractive counts may be made. The preferred form of counter is an electronic counter for several stages wherein rapid counting is essential, after which mechanical stages may be preferably used. Actually, a mechanical counter may be used throughout if operation at low speed is acceptable. Accordingly, for simplicity only, a mechanical form of counter is first described.

The output of the tube 76 for phase I is fed to the grid of a triode 80. A second triode 82 is also energized from the output of 76 through a phase inverter 84. Thus the anode circuits of triodes 80 and 82 for phase I have anode circuit currents which are 180° out of phase with each other.

The output of the trigger 78 for phase II is fed in identical fashion to triodes 86 and 88, the latter being energized through a phase inverter 89. The anode circuits of 86 and 88, therefore, are 180° out of phase of each other and 90° out of phase with the corresponding circuits of phase I. The anode of triode 80 is connected to an electromagnet coil 90 and that of anode 82 to a coil 92. The coils are mounted on a core 94 having poles between which is placed an armature 96. The armature is adapted to be attracted to one pole or the other depending upon the energization of coil 90 or coil 92. Similarly for phase II the output of the triodes 86 and 88 is connected to coils 98 and 100 on a core 102. An armature 104 is adapted to be attracted to one or the other of the poles.

The armatures 96 and 104 are connected to operate a multi-tooth star wheel 106 which is mounted for rotation in any suitable manner. A length of wire 108 is connected to one of the armatures, say the armature 96. The wire should be flexible in bending but fairly stiff longitudinally. A piece of piano wire has been found satisfactory for the short length here required. The wire is provided with two pins 110 and 112 which are selectively adapted to enter between selective teeth of the wheel 106. Thus, in the position shown, the pin 110 is between two teeth while the pin 112 is clear of the teeth. This is the condition existing when the armature 96 is attracted to the upper pole. Upon energization of the lower pole through the coil 92 the pin 110 is moved downwardly.

A wire 114 is connected between the pin 112 and a suitable fixed point. Another wire 116 is connected from the armature 104 to the pin 112. It will be seen that the pin 112 is primarily a detent member and substantially constrained to undergo a simple radial (left and right) motion by reason of the connection of the wire 114. On the other hand, the pin 110 is free to undergo a compound motion. This compound motion is made up of the tangential (up and down) component due to the motion of the wire 108 together with a sidewise component due to the lateral motion of the wire 116. The compound motion is permitted because of the flexibility of the wire 108 between the pin 110 and the pin 112. Since the coils of the magnet 102 are energized 90° out of time phase with the coils of magnet 94 and since the wires 108 and 116 are phased in space by 90°, the pin 110 will undergo a rotary motion. The direction of the rotary motion of the pin 110 depends on whether the time energization of the coils 98 and 100 is in a leading or lagging relation to the energization of the coils of the magnet 94. Thus, for a forward motion of the measuring carriage 26, the pin 110 will undergo, say, a clockwise motion, while a reverse motion of the carriage will cause the pin 110 to undergo a counter-clockwise motion. The range of motion of the pin 110 is so related to the spacing of the teeth that one tooth is advanced for each revolution of the pin. It will be observed that the pin 110 engages with an intertooth space at the left of the wheel just as pin 112 is being retracted from the inter-tooth space at the right of the wheel so that the motion is permitted. When the pin 110 retracts from engagement, the pin 112 enters an intertooth space and this serves as a detent to prevent over-rotation.

Because of the lightness of the parts, it is possible to count faster than with conventional mechanical counters. The wheel 106 is advanced one tooth for each complete rotation of the trace on the cathode ray tube 74. Hence, the position of the wheel 106 indicates the net number count on any succession of motion of the carriage 26. The position of the spot on the screen of the tube 74 may be used to interpolate for more precise indications.

The trigger circuits 76 and 78 are not essential, and if desired the sinusoidal outputs of the multipliers may be amplified linearly and fed to the counter. Square-wave actuation is preferred, however, in order to reduce the variations to substantially constant intensity. It will be understood by those skilled in this art that the fringes are of greatest clarity (i.e. there is a maximum difference between light and dark) when the lengths of the two paths of light are equal. As the mirror 42 moves away from the position of greatest clarity, the fringes become weaker. The extent to which the mirror 42 may be moved before the fringes become indistinct depends partly on time of vibration of the atoms of the light source. Over the useful range of movement the outputs of the multipliers vary considerably and hence the trace on the cathode ray tube will be a circle of changing diameter. This is not objectionable so far as the cathode-ray tube is concerned, because the amplifiers for the cathode-ray tube are so biased that if the light falling on both multiplier tubes should be set at its mean value simultaneously for both, the spot would fall in the center of the screen. This insures that the circular pattern remains central on the screen so that the angular position of the spot with respect to the center of the screen continues to give an accurate measurement of fractional fringes regardless of the distinctness of the fringes. However, the input to the counter should be of nearly constant intensity, in order that the range of motion of the pin 112 shall be sensibly uniform. The same requirement applies to an electronic counter. This is best accomplished by squaring the outputs of the amplifiers 86 and 88 in any suitable manner, here indicated by the use of trigger circuits.

It will be observed that the input to the counter is different from that frequently employed in counting devices, since the counter may be said to be subjected to continuous or "non-impulsive" excitation. This excitation is preferable whether a mechanical or electronic counter is used.

An electronic counter operating on a similar principle is shown in Fig. 4. This figure shows a circuit for a binary electronic counter stage. As many stages may be used as are necessary for counting to any desired number. In the subsequent description of this circuit, in order to avoid complicated cross connections on the drawing, some of the connections are given symbolically. Thus, all points bearing the same designation are connected to a common point. For example, all circles marked A are connected together, all circles marked B are connected together, all circles marked A' are connected together and so on.

To introduce the electronic counter, the system of Fig. 3 is cut off at the dot and dash line, and the circuit of Fig. 4 is added to the left hand portion of Fig. 3 by joining correspondingly lettered connections at the cut. The circuit in Fig. 4 will now be known as stage 1. The circuits for succeeding stages follow the pattern of Fig. 4 exactly.

The single stage shown in Fig. 4 includes four triodes. These are grouped in two trigger pairs, which are of conventional construction except for the network of connections controlling their operations. Triodes 122 and 124 form one trigger pair. Triodes 126 and 128 form the other pair. It will be observed that all connections are direct as opposed to capacitative. The inputs which drive the stage are points A, A', driven by phase I, and B, B', driven by phase II. It will be remembered that by reason of the phase inversion in tubes 84 and 89 the potential of A is always high while A' is low and A is low while A' is high, likewise for B and B'.

Consider the trigger pair comprising triodes 122, 124. Each anode is connected to a source of positive potential through resistances 129, 130. The anode of each tube is connected to the grid of the companion tube through a resistor. These resistors for phase I are shown at 132 and 134.

The anodes of the tubes 122 and 124 are connected to the output terminals designated C and C'. These points are shown conected to the right hand edge of Fig. 4 indicating that they form part of the input circuit of stage 2 in a manner exactly analogous to the way in which terminals A, A', the output of phase I form part of the input circuit of stage 1.

The grid of tube 122 is connected through a resistor 136 to point B which, as heretofore noted, forms one of the terminals for the input of phase II. Similarly, the grid of tube 124 is connected through a resistor 138 with the point B. The grid of each tube is also connected to a control circuit, which for the tube 122, is indicated generally by the character 140. The control circuit 140 comprises a pair of parallel resistors 142 and 144, the latter being connected to terminal A and the former to terminal D' which is one of the output terminals of phase II. This control circuit also includes another pair of resistors 146, 148, the former being connected to point D and the latter to A'. All of these four resistors are connected at the bottom to the grid of tube 122 except, it will be noted, that resistors 142 and 144 are connected through a rectifier 150, while the other two resistors are connected through a rectifier 152 to the common connection 154 which leads to the grid. The rectifiers may be of any simple construction, preferably selenium or germanium crystals. The object is to prevent one set of resistors from neutralizing the effect of the other, as will later appear.

The control circuit also includes resistors 156 and 158 which are connected respectively to the separate resistor pairs previously described. The resistors 156 and 158 are together connected to a source of negative potential.

A similar control circuit 160 is connected to the grid of tube 124. It is identical with the control circuit 140 except that its terminals are connected respectively to terminals D', A', and D, A.

The pair 122, 124 constitutes a trigger pair which, by itself, operates in conventional trigger fashion. That is to say, either the tube 122 has its anode circuit conducting and the tube 124 non-conducting, or vice-versa. Point C is at high potential when the anode circuit of tube 122 is non-conducting, while at the same time point C' is at low potential because the anode circuit of tube 124 is conducting. Upon occurrence of a situation in which conduction through 124 is cut off, point C' goes immediately to high potential. The transfer of potential through resistor 132 from the plate of 124 to the grid of 122 then causes tube 122 to assume the conducting condition so that point C then goes to low potential. Stable equilibrium can exist only when one tube of the pair is conducting and the other is non-conducting. Thus, there are two possible conditions of stable equilibrium, and there is always a shift from one to the other whenever conduction is cut off in the previously conducting tube.

The manner in which the trigger circuit is operated is described as follows: Assume that 122 is in the low potential condition, namely the condition in which its anode circuit is conducting. Its grid is now positive because of the positive potential transferred from the anode of tube 124 through resistor 132. A connection 161 is made from a source of negative potential to the grid of tube 122 and also a connection is made from the same negative source through resistor 163 to the grid of tube 124. The various potentials are such that when B goes to a low potential condition and D' and A both go to a low potential condition at the same time, the effect will be to make the grid of 122 sufficiently negative so that it can no longer conduct. These are not the only conditions for making tube 122 non-conducting but are cited as a specific example. Whenever tube 122 becomes non-conducting, the potential of point C immediately rises and this converts tube 124 to the conducting condition.

The circuit diagram for potentials on the grid of tube 122 is given in Fig. 6. Resistors 161 and 156 are connected to a negative potential source. When the triode 122 is conducting (C at low potential), terminal C' is at high potential. The potentials at A, B and D' and the values of the resistors are such that if any one or more of the points A, B, D' are at high potential, the grid of 122 will not be sufficiently negative to cut off conduction. However, when all those points are at low potential, the grid goes negative sufficiently to cut off conduction, C goes to high potential, and conduction is transferred to the other triode of the pair.

Conduction in 122 can likewise be cut off if terminals B, A' and D are all at low potential at the same time. The purpose of the rectifiers 150 and 152 will now appear. These rectifiers isolate any net positive potential of A, D' or A', D from the grid; if they were not present, a low potential at A, D' might be neutralized by a high potential at A', D.

Before further describing the operation of the system, it should be noted that the second trigger pair 126, 128 is set up in substantially identical fashion to that first described. The anodes are indicated by the terminals D and D' which constitute the output terminals of the trigger pair. The grids are connected through resistors 136' and 138' to terminal B'. The grids of the tubes are connected to control circuits 162 and 164 which are identical with the circuit 140. The control circuit 162 is connected to terminals C', A, C, A', while the control circuit 164 is connected to terminals C', A', C, A.

The operation of the electronic counter stage may best be described by referring to Fig. 5, which shows the space variation of potentials at various points in the system for various positions of the measuring head which are indicated in terms of fringes at the top of Fig. 5. For the moment let us assume that the measuring head is moving uniformly from left to right. This will allow us to consider the potential variations in terms of time. The uppermost curve shows the output of the multiplier of phase I. This is a sine wave. The second curve is also a sine wave which represents the output of phase II. This second curve is 90° out of phase with the upper curve. Upon passage through the trigger circuit 76, the phase I output is converted to the square wave shown in the third curve. This represents the potential of point A. The output of phase II trigger circuit is shown in the curve immediately below and this represents the potential of point B. The potentials of points A' and B' are not shown on this drawing and are unnecessary because when A is at high-potential, A' is at low-potential, as above described. The next curve shows the variations of potentials for points C and D. It is possible to show how the variations in the curve for potentials at C and D depend upon the preceding square wave curve for A and B. Take the time represented by the first vertical dot-and-dash line represented by $t_1$. At that time, points A, B and D are at high potential and C is at low potential. These conditions are mutually consistent. After a short time (indicated at $t_2$) B goes to low potential and correspondingly, B' goes to a high potential condition. This does not make any immediate change in either C or D, because the potential on the grid of 122 has not been reduced sufficiently to cut off anode conduction for that tube. However, after a short time, represented now by the dot-and-dash line $t_3$, point A drops to low potential. Points A, B and D' are now all at low potential. Therefore, as shown by Fig. 6, the potential on the grid of the tube 122 becomes sufficiently negative so that conduction in tube 122 is cut off. At this time point C rises to high potential and correspondingly, point C' drops to low potential. Point D continues in its high potential condition as indicated by the curve.

A complete analysis of this type shows that the conditions for conversion of any of the anode terminals from low potential (conducting) to high potential (non-conducting) condition are as follows:

| Anode: | Terminals at low potential |
| --- | --- |
| C | B, A, D' or B, A', D |
| C' | B, A, D or B, A', D' |
| D | B', A, C' or B', A', C |
| D' | B', A, C or B', A', C' |

A complete cycle of operations for stage 1 is illustrated in Fig. 7. Here the four terminals C, C', D, D' are indicated for the times $t_1$, $t_3$, $t_5$, $t_7$ and $t_9$. A light circle represents a low-potential (anode-conducting) condition while a hatched circle represents a high-potential or non-conducting condition. Starting with $t_1$, C and D' are low and C' and D are high. There is no change at $t_2$. At $t_3$, C' is cut off and C' goes to low potential. At $t_5$ there is an interchange between D and D', at $t_7$ another interchange between C and C', and at $t_9$ another interchange between D and D' which carries the pattern back to the original condition.

The foregoing is an example of counting in one direction which may be considered "forward" counting. In that case, phase II leads phase I. Assume that immediately after $t_9$ the carriage starts to move backward. The variations in conditions are now found by following the curves in Fig. 5 from right to left. The various states which appeared previously now reappear in inverse order. The pattern of Fig. 7 is followed out backward, that is, at some times $t_{11}$, $t_{13}$, $t_{15}$ and $t_{17}$, the conditions go progressively through those shown for $t_7$, $t_5$, $t_3$ and $t_1$. This is backward or subtractive counting. It will be noted that in this case phase I may be said to lead phase II.

In adding stage 2, the respective output terminals C, C' and D, D' become also the input terminals of stage 2, which is identical to stage 1. The corresponding output terminals of stage 2 can then be labeled respectively E, E' and F, F'. The two lower curves in Fig. 5 represent the variation in potential of points E, F. It will be seen that the pattern of potential changes for E, F is identical with the patterns for A, B and C, D except that the time base is again doubled. Furthermore, it will be seen that the relation of changes in E, F to changes in C, D is identical to the relation of changes in C, D to changes in A, B. Each stage may be considered as the prime driver of its succeeding stage in the sense that it is necessary to consider changes only in the former in order to determine the response of the latter. Stages may be cascaded as desired, and a mechanical counter of the type shown in Fig. 3 may be used at the end if desired.

Reading of the contents of the counter is accomplished by considering the state of one trigger pair in each stage to represent the value of a binary digit corresponding to that stage. Thus, referring to Fig. 5, the potentials, at a given point, of E, C, A considered as representing the value 1 when high, 0, when low, will indicate in binary form the number of half fringes between the left hand edge of the figure and the given point.

It will be observed that since there are two trigger pairs or elements in each stage and each element can exist stably in either of two states there are four possible states for the stage as a whole. However, each stage indicates the value of only one binary digit and only one of the elements of the stage is required for this indication. There is thus an apparent redundancy of states and elements. Nevertheless, the full number of states and elements is required in order to maintain continuous reversible control through the chain of stages. This type of control will now be contrasted with the usual impulsive control and reasons for preferring it to impulsive control will be described.

In the discussion which follows use will be made of the term "transition point." Referring to Fig. 5, any position where a trigger pair changes state is a transition point. In particular the transition points where C changes state may be termed "count points" since these points mark the registration of whole fringes. A transition point is the same point regardless of the direction in which it is traversed. Referring to Fig. 8 which represents a view of cathode ray tube 74 it will be seen that a count point is marked by the passage of the spot through line X. Other details of Fig. 8 will be discussed later.

When a transition occurs in the counter some of the elements change state while others remain in the same state. In general the change of state of any element, which we will term a controlled element, is brought about directly by the change of state of an element in the preceding stage, which we will call a controlling element. At the same time certain elements which we will call holding elements, which do not change state at this particular transition, exercise a latent control on the controlled element in the sense that their states determine the existence and polarity of the control exercised by the controlling element.

The fact which especially characterizes this counter, is that in the region of any given transition point, the control existing between any controlled element and its controlling element is continuous and reversible in the sense that in the region immediately on either side of this particular transition point the existing steady state of the controlled element is uniquely determined by the existing steady state of the controlling element. This means that in the event of oscillation about a single transition point it is not necessary that the transition point be crossed decisively or that time be allowed at each crossing for the state changes initiated by that crossing to proceed to completion, in order to prevent a miscount.

Furthermore, the only requirement on the response speed of an element in any stage is that after passing a transition point involving that element, that element should have substantially attained its appropriate steady state before a different transition point involving that stage is reached. Since the separation between transition points involving a given stage becomes greater the higher the stage, the response speed requirement becomes correspondingly less.

In contrast to the situation described above, I am aware that it is possible to effect reversible counting with an impulsive counter wherein a forward pulse is registered in passing the count point in a forward direction, and a reverse pulse is registered in passing the count point in the reverse direction. Such a counter can be built having only one element or trigger pair per stage. It suffers from the disadvantage that in the case of an excursion across a count point and return, time must be allowed for registration of both a forward and reverse pulse. If the two crossings occur too close together, one of the pulses may not be registered properly and a miscount will occur since the final steady state of the controlled element is not uniquely determined by the state of the controlling element, but requires also a history of correct pulse registration.

In order to prevent such too close crossings of a count point which may occur either as a result of high frequency noise in the primary signal or simply as the result of a slow excursion which passes the count point by only a minute distance, it is necessary to introduce backlash. This is illustrated in Fig. 8. Assuming that the spot moves clockwise in forward counting, then for the impulsive counter the count point in the forward direction is made to occur when the spot crosses line Z, while the count point in the reverse direction is made to occur when the spot crosses line Y. The amount of backlash is indicated by the distance between Y and Z and should in general be greater than the oscillations due to noise. When the interferometer is set for greatest sensitivity, that is, when both optical paths are of nearly equal length, the tube will show a trace represented by circle 166, but when the paths differ markedly, the sensitivity goes down and the trace becomes somewhat as shown at 168. Obviously the smallest trace which can be counted has a diameter greater than the backlash. Therefore the use of a continuous control counter, which does not require backlash, will increase the permissible counting range. It should also be pointed out that, especially when the noise amplitude is reduced by filtering, the trace size is reduced as the counting speed increases, and the continuous control counter with its lack of backlash can be used at higher speeds.

The non-impulsive mechanical counter previously described shares with the preferred electronic counter the qualities of continuous reversible control and of requiring no backlash for reliable operation.

The counters herein described, while exceptionally useful in combination with the measuring and optical devices of the present invention, are not limited thereto but are of general application.

Mention has been made of the motor circuit by which motion of the head 26 toward and from the work may be controlled. This is described in greater detail in connection with Fig. 9 which is a wiring diagram for the motor circuit. The motor 18 is energized through two relays 170 and 172. The carriage 32 carries the switch 38 previously mentioned. The switch 38 has two contacts 174 connected to one line and mounted on but insulated from the carriage. For forward motion of the carriage, one of the contacts 174 is closed on a contact 176, connected through contacts 178 of a key-operated manual switch 180 to the winding of relay 172, which in turn is connected to the other line.

The relays 170, 172 have armatures 182, 184 respectively, normally held against upper fixed contacts by suitable springs and adapted to be attracted toward the lower contacts upon relay energization. The positive line is connected to both upper contacts by wires 188 and 190, while the negative line is connected to both lower contacts by wires 192 and 194. The motor armature is connected to the relay armatures 184, 186.

When the switch contacts 174, 176 are closed and the contacts 178 are closed by the key, relay 172 is energized. The motor circuit is then closed from the plus terminal through the wires 188, 190, the relay armature 182, the motor 18, the relay armature 184 and the wire 192 to the negative line. The motor then operates in the direction to move the carriage toward the work. When the anvil engages the work, the contacts 38 are opened, thereby deenergizing the relay 172 and causing its armature 184 to close on the upper contact to short-circuit the motor and bring it quickly to a stop. The carriage may now be backed away from the work. This may be done manually by turning the key of the switch 180 to close contacts 196 which are in series with the relay 170. Energization of the relay 170 causes operation of the motor, but with reversed armature connections, whereby the motor operates in the reverse direction.

It is to be observed that the forward motion of the carriage can be effected only when the switch 178 is closed, this switch being in series with the switch contacts 174, 176. Backing off motion of the carriage can, however, be effected either by closure of the switch contacts 196 or by an additional contact 198 on the carriage. It will be noted that by reason of the connection 200, the contacts 174, 198 are in parallel with the contacts 196, whereby closure of either set operates the motor in the back-off direction. The principal purpose of the contact 198 is to cause a back-off motion of the carriage when a piece of work is forced into position between the measuring anvils. In that case the motor backs the carriage away until all contacts of the switch 38 are open.

Referring to Fig. 1, the head 26 is normally urged forward by a spring 202 connected with an adjusting screw 204 in a projection extending upwardly from the post 32. In order that the measuring contact pressure may be substantially independent of the position of the head with respect to the carriage, the variation in force exerted by spring 202 and reeds 28, 30 may be counter-acted by a "negative" spring. The negative spring is shown at 206 and comprises a flat spring member received in opposed notches of the carriage and the post 31, the spring being bent so that it exerts a straight upward pressure on the head in neutral position. When the head is deflected to either side of neutral, the force of spring 206 has a lateral component which, over a short range, is substantially proportional to the deflection and in a direction which tends to increase the deflection. This force balances the net force differential of the combination 28, 30, 202 which is also proportional to the deflection but in the normal direction which tends to reduce the deflection.

In operation for absolute measure of a work piece such as that indicated at 25 in Fig. 1, the head 26 is brought up into contact with the anvil 24. This is the zero position. The head is then backed away sufficiently to allow for introduction of the work piece 25. After introduction of the work piece, the head is moved in the opposite direction until it contacts the piece 25. The counts made in retracting the head may be considered as in the positive direction and the counts made in moving the head toward the work piece may be considered as being in the negative direction. Or conversely, the head may first be moved up to the work piece, then retracted so that the work piece can be withdrawn and then finally moved up into contact with the anvil 24. In any case, the device counts both forward and back whereby the actual measure of the work piece is indicated. In any case, where measurements against secondary standards are acceptable, the time of measurement may be shortened by merely moving the head 26 sufficiently to accommodate successively the work piece and a standard gage member.

An absolute measurement may be made, in one step, over the entire range of distinct fringes which in the case of krypton 5870A and with a usefully large diameter for aperture 58, is at least two inches. For longer measurements, the carriage 16 may be clamped in any suitable manner. The head 26 rests against the backstop screw (not moved) and thus remains fixed with respect to carriage 16. Then the counter is shut off and the entire interferometer (including the light source, prism, etc.) is moved relative to the mirror 42 to establish a new starting point. The counter is turned on again, the carriage is unclamped, and the measurement proceeds as before. Any vibration introduced during the clamping or unclamping of the carriage is fed into the counter and is thus automatically accounted for, without error. It is only necessary to assure that the action of moving the interferometer parts does not move the carriage and vice versa. By this stepping means, an absolute measure of substantially any length may be obtained. In making such a measurement, it is desirable always to move the interferometer body an approximately integral number of fringes as indicated by the cathode ray tube interpolation pattern (which is not turned off) and to keep track of the cumulative effect of any small departures from this integral fringe motion.

Having thus described my invention, I claim:

1. In a reversible digital counter stage, the combination of means for generating two non-impulsive inputs which are phase-displaced relative to each other, each input being capable of rapid transitions between two values, trigger means having a plurality of stable states and responsive to one input to generate a non-impulsive output, additional trigger means responsive to the other input to generate a non-impulsive output, and coupling means between the outputs and inputs to apply to said trigger means combined signals to effect a transition of one trigger means depending on the state of the several inputs and outputs.

2. In a reversible digital counter stage, the combination of means for generating two pairs of inputs, the inputs of each pair being of opposite phase and the two pairs being phase-displaced relative to each other, a first and a second trigger pair each having two stable states and arranged to produce two phase-displaced pairs of outputs, and means for applying to the separate trigger pairs combined inputs derived from potentials of said input pairs and said output pairs.

3. In a reversible digital counter stage, the combination of means for generating a pair of oppositely phased inputs designated A, A' and a second pair of oppositely phased inputs designated B, B'; the said pairs being phase-displaced relative to each other; a first and a second trigger pair each having two stable states and arranged to produce output pairs C, C' and D, D', respectively, similar to the input pairs but of double period; means for applying input B to the first trigger pair and input B' to the second trigger pair, means for additionally applying to the first trigger pair inputs involving combinations of A, A' and D, D', means for additionally applying to the second trigger pair inputs involving combinations of A, A' and C, C', and means for causing a change of state of a trigger pair upon occurrence of predetermined relations among its several inputs.

4. In a reversible digital counter stage, the combination of means for generating a pair of oppositely phased inputs designated A, A' and a second pair of oppositely phased inputs designated B, B'; the said pairs being phase-displaced relative to each other; a first and a second trigger pair each having two stable states and arranged to produce output pairs C, C' and C, D', respectively, similar to the input pairs but of double period; means for applying to the first trigger pair combined inputs derived from B and combinations A, A' and D, D'; and means for applying to the second trigger pair combined inputs derived from B' and combinations of A, A' and C, C'.

5. A multistage reversible digital counter comprising a plurality of stages, each stage as defined in claim 2, and connections for utilizing as input pairs of any stage the output pairs of the next preceding stage.

6. A multistage reversible digital counter comprising a plurality of stages, each stage as defined in claim 3, and connections for utilizing as input pairs of any stage the output pairs of the next preceding stage.

7. A multistage reversible digital counter comprising a plurality of stages, each stage as defined in claim 4, and connections for utilizing as input pairs of any stage the output pairs of the next preceding stage.

References Cited in the file of this patent

UNITED STATES PATENTS

| | | |
|---|---|---|
| 2,462,292 | Snyder | Feb. 22, 1949 |
| 2,479,802 | Young | Aug. 23, 1949 |
| 2,481,347 | Riggen | Sept. 6, 1949 |
| 2,516,146 | Prugh | July 25, 1950 |
| 2,536,916 | Dickinson | Jan. 2, 1951 |
| 2,539,623 | Heising | Jan. 30, 1951 |
| 2,656,106 | Stabler | Oct. 20, 1953 |

OTHER REFERENCES

Reversible Decade Counting Circuit, Regener, The Review of Scientific Instruments, vol. 17, No. 10, October 1946, pages 375–6.